(12) United States Patent
Lindberg et al.

(10) Patent No.: US 11,769,084 B2
(45) Date of Patent: Sep. 26, 2023

(54) METHOD FOR IDENTIFYING SLOW TRANSIENT VARIATIONS AND/OR LOCAL SPATIAL VARIATIONS OF A PHYSICAL PROPERTY IN A SET OF DATA POINTS

(71) Applicant: Ningbo Geely Automobile Research & Development Co., Ltd., Ningbo (CN)

(72) Inventors: Simon Lindberg, Gothenburg (SE); Robert Moestam, Växjö (SE)

(73) Assignee: NINGBO GEELY AUTOMOBILE RESEARCH & DEVELOPMENT CO., LTD., Ningbo (CN)

(*) Notice: Subject to any disclaimer, the term of this patent is extended or adjusted under 35 U.S.C. 154(b) by 512 days.

(21) Appl. No.: 16/994,029

(22) Filed: Aug. 14, 2020

(65) Prior Publication Data
US 2020/0372191 A1 Nov. 26, 2020

Related U.S. Application Data

(63) Continuation of application No. PCT/CN2019/074872, filed on Feb. 12, 2019.

(30) Foreign Application Priority Data

Feb. 21, 2018 (EP) .................. 18157879

(51) Int. Cl.
*G06Q 10/04* (2023.01)
*G06F 30/28* (2020.01)
(Continued)

(52) U.S. Cl.
CPC ......... *G06Q 10/04* (2013.01); *G06F 18/2113* (2023.01); *G06F 30/15* (2020.01); *G06F 30/28* (2020.01)

(58) Field of Classification Search
CPC .......... G06F 30/15; G06F 30/28; G06F 30/20; G06F 30/23; G06F 2111/10; G06F 17/18;
(Continued)

(56) References Cited

U.S. PATENT DOCUMENTS 6,959,269 B1 10/2005 Welterlen
8,660,717 B2 2/2014 Calise
(Continued)

FOREIGN PATENT DOCUMENTS

| CN | 107194045 A | 9/2017 |
|----|-------------|--------|
| GB | 2340275 A | 2/2000 |
| WO | 2017060737 A1 | 4/2017 |

OTHER PUBLICATIONS

R.J. Corin et al., "A CFD investigation into the transient aerodynamic forces on overtaking road vehicle models," Journal of Wind Engineering and Industrial Aerodynamics 96 (2008) 1390-1411 (Year: 2008).*

(Continued)

*Primary Examiner* — Steven W Crabb
(74) *Attorney, Agent, or Firm* — Tucker Ellis LLP (57) ABSTRACT

Method for identifying slow transient variations and/or local spatial variations in vehicle related fluid dynamic conditions of a physical property in a set of data points. The method includes obtaining a first set of data points, calculating a temporal filtered value of the representation of the physical property for at least a portion of the first set of data points distributed over the total time period, combining at least a portion of the calculated temporal filtered values to obtain a second set of data points, and analysing in time sequence the second set of data points over at least a portion of the total time period.

16 Claims, 2 Drawing Sheets

(51) Int. Cl.
*G06F 30/15* (2020.01)
*G06F 18/2113* (2023.01)

(58) Field of Classification Search
CPC ........ G06K 9/623; Y02T 90/00; G06Q 10/04; G01M 9/08
See application file for complete search history.

(56) References Cited

U.S. PATENT DOCUMENTS

2014/0081609 A1* 3/2014 Calderon .............. G01M 9/065
  703/2
2018/0292290 A1 10/2018 Hoskins
2019/0025813 A1* 1/2019 Cella ................. G05B 23/0283

OTHER PUBLICATIONS

International Search Report from corresponding International Patent Application No. PCT/CN2019/074872, dated May 16, 2019, 2 pages.
European Search Report from corresponding European Patent Application No. 18157879, dated Jul. 3, 2018, 1 page.

* cited by examiner

METHOD FOR IDENTIFYING SLOW TRANSIENT VARIATIONS AND/OR LOCAL SPATIAL VARIATIONS OF A PHYSICAL PROPERTY IN A SET OF DATA POINTS

RELATED APPLICATION DATA

This application is a continuation of International Patent Application No. PCT/CN2019/074872, filed Feb. 12, 2019, which claims the benefit of European Patent Application No. 18157879.0, filed Feb. 21, 2018, the disclosures of which are incorporated herein by reference in their entireties.

TECHNICAL FIELD

This invention relates to a method for identifying slow transient variations and/or local spatial variations of a physical property in a set of data points. In particular, the invention relates to simulations of vehicle related fluid dynamic and aerodynamic conditions that are difficult to imitate in a wind tunnel. The invention also relates to a data processing system, a computer program product and a computer-readable medium related to such a method.

BACKGROUND OF THE INVENTION

The use of computer simulation models, prototype vehicles, vehicle models, and wind tunnel tests are important tools in the development of cars and other vehicles for establishing fluid dynamic and aerodynamic properties, such as reducing e.g. air resistance and wind noise based on experimental studies of various fluid dynamic and aerodynamic phenomena.

The impact of transient winds on a vehicle is one critical design factor when developing new vehicle models. For example, the crosswind stability may affect the steering properties and the riding comfort of the vehicle. If a vehicle has a high stability with low steering impact when being influenced by a sudden wind change or a transient wind condition, the vehicle has a low sensitivity for external wind disturbances, which is a desired property. A low sensitivity for external wind disturbances gives the feeling of a safe and confident vehicle construction. The crosswind stability may be the result of complex unsteady interactions between fluid dynamic conditions, vehicle dynamics and impact from the driver.

The crosswind stability of vehicles is mainly relevant for passenger comfort, but may be a safety issue in extreme weather conditions. As indicated above, the crosswind stability influences the driver's perception of vehicle safety in particular at high speeds. A vehicle that has a high crosswind sensitivity generally requires more steering action by the driver and thus may raise concerns regarding the stability and safety of the vehicle design.

The term crosswind stability describes the behaviour of the vehicle in air flow conditions with lateral velocity components. Today, vehicles are becoming lighter and a reduction in vehicle weight increases the ratio of fluid dynamic loads in relation to the inertia of the vehicle. Therefore, the shift towards more streamlined and lighter cars is likely to have a negative impact on driving stability and consequently the safety and comfort perceived by the occupants of the vehicle driver.

However, some fluid dynamic situations are generally difficult to imitate in wind tunnels, such as transient wind conditions with a sudden change of the relative wind direction, because neither the direction of the artificial wind nor the position of the vehicle (the vehicle's angle) in relation to the direction of the artificial wind can be changed/turned quickly enough. Such a sudden wind change might occur, for instance, when a vehicle passes the end of a large building or a group of trees located close to a road and becomes exposed to a side wind that is not negligible in relation to the "wind" directed towards the front of the vehicle as a result of its forward motion.

Similar fluid dynamic conditions with transient wind conditions may further occur when a vehicle is impacted by the airflow from other vehicles. These fluid dynamic conditions are difficult to imitate also in real vehicle testing situations with sensors and in traditional computer simulations due to the processing of very large amounts of data needed.

Computer simulations of fluid dynamic and aerodynamic phenomena, computational fluid dynamic (CFD) simulations, are well known as such and may be used to simulate wind tunnel-related situations or real wind conditions. For CFD simulations of e.g. air pressure variations, friction variations or temperature variations at a vehicle body surface exposed to an air flow it is usually important to visualize the data in a comprehensible way. If all the data in a large number of positions at the surface varies rapidly with time it is difficult to visually discern any meaningful patterns. Typically, some form of filtering method is applied to such data to even out differences between spatially neighbouring data points. This results in a spatially smoothed/damped set of data points from which useful information usually can be visually obtained.

However, such spatial data filtering methods run the risk of smoothing out local differences that may be of importance in, for instance, situations where a vehicle is subject to a sudden relative wind shift. Further, the information over the entire surface or whatever component is studied may still vary too rapidly in time to make it possible to visually identify slow fluctuations.

Vehicle development tools used today, such for example crosswind testing facilities or constant yaw wind tunnel tests do not fully replicate real-world fluid dynamic situations. There is thus a need for a method of identifying slow transient variations and/or local spatial variations of a physical property in a set of data points, in particular when simulating vehicle related fluid dynamic and aerodynamic conditions that are difficult to imitate in a wind tunnel, in real wind conditions, or in traditional computer simulations.

SUMMARY OF THE INVENTION

The invention concerns a method for identifying slow transient variations and/or local spatial variations in vehicle related fluid dynamic conditions of a physical property in a set of data points for simulating vehicle related fluid dynamic conditions, the method comprises the steps of:

A) obtaining a first set of data points related to a vehicle body surface, wherein the first set of data points is based on measured values or simulated data, wherein each of said data points is associated with at least i) a point of time, ii) a position in at least two dimensions of the vehicle body surface, and iii) a value representing a measured or simulated fluid dynamic physical property, wherein the physical property is pressure of a fluid, pressure of a mixture of fluids, friction between a surface and a flowing fluid or mixture of fluids, or temperature, wherein the data points in each position are separated in time by a sampling time step, and wherein the first set of data points represents a total time period;

B) calculating a temporal filtered value of the representation of the physical property for at least a portion of the first set of data points distributed over the total time period, wherein the temporal filtered value is based on a plurality of values of the representation of the physical property in the same position obtained over an effective filtering time period covering a plurality of data points, wherein the effective filtering time period has a certain time relation to the data point for which the calculation is carried out and wherein the effective filtering time period is considerably longer than an average sampling time step and considerably shorter than the total time period:

C) combining at least a portion of the calculated temporal filtered values of the representation of the physical property with the point of time and position of the corresponding data point in the first set of data points so as to obtain a second set of data points where each value representing the physical property is the temporal filtered value; and D) analysing in time sequence the second set of data points over at least a portion of the total time period.

The purpose of the method is to understand which aspects of the vehicle's geometry that is producing the sensitivity for external fluid dynamic disturbances, wherein the sensitivity for transient wind conditions can be minimized when developing a new vehicle.

The first set of data points obtained in step A, which may be a selection of a larger set of data points, may be based on measured values or on simulated data and includes a point in time, position coordinates on a two-dimensional surface or in a three-dimensional space (such as a bent/shaped surface, e.g. a surface of a vehicle body) and a value representing the fluid dynamic physical property such as for example air pressure, pressure of other fluid or mixture of fluids, friction between a surface and a flowing fluid or mixture of fluids, or temperature. This representative value has a certain relation to a measured or calculated "true" value of the physical property in a certain position and point of time, but the actual "true" value does not necessarily have to be involved in the calculations. A mixture of fluids may refer to contaminated winds, where the air for example is mixed with water. The mixture of fluids may give rise to force variations impacting the vehicle. Measured values may be obtained from sensors applied on the vehicle body surface, where the sensors may be placed in different positions on the vehicle body. The vehicle body may be exposed to transient wind conditions and the sensors are measuring the fluid dynamic physical property in each sensor position. Simulated values may be obtained from a simulated vehicle body surface, where the simulated vehicle body may be exposed to transient wind conditions.

In step B the variation of the value of the representation of the physical property in a certain position is damped in time by calculating the temporal filtered value, which is based on a plurality of values in the same position over a certain time period that is much longer than the sampling time step (the effective filtering time period). Rapid changes of the air pressure or other physical property, i.e. variations within a time scale similar to the sampling time step, are thus damped out.

The second set of data points generated in step C, which not necessarily includes all data used in step B, contains the original point of time and position as well as the corresponding time-damped value of the representation of the physical property.

In step D the second set of data pointe are analysed in time sequence, for instance visually by preparing a video of the data points. (Preparing a video based on data points containing information on point of time and position is known as such. To make the video useful the preparation preferably comprises setting a certain colour to a certain value range of the representation of the physical property so that colour changes indicate changes of the value of the physical property.) The second set of data points may alternatively be analysed without a video using a computer, i.e. an algorithm, to identify interesting variations or absolute values of the physical property (or of the value representing the physical property).

The method involves three different time scales: the sampling time scale, the filtering time scale and the total or analysis time scale. (The analysis does not necessarily have to cover the entire total time period.) Typically, there should be a difference of at least one order of magnitude between the different time scales. If the sampling time scale and the filtering time scale would be of the same magnitude there would be no evening out of the rapid fluctuations. If the filtering time scale and the total/analysis time scale would be of the same magnitude it would not be possible to study the phenomenon over time since there would only be one or maybe two damped or averaged values to look at.

All in all the inventive method makes it possible to i) identify slow transient variations of the physical property, because rapid variations are evened out and because the process can be followed over time as a result of using a the short filtering time period compared to the total time period, and/or to ii) identify local spatial variations of the physical property, because the temporal filtered data points contain the original information on the position coordinates. In a situation where the slow transient variations are of primary importance it is possible to complement the method with some form of spatial filtering to further reduce variations that might complicate the analysis.

As an example, to study the effects of a vehicle subject to a sudden wind change, i.e. to study the effects of a sudden change of the direction of an air flow at the surface of a vehicle body, the total time of interest to analyse may be a few seconds. A suitable sampling time step may in such a case be around 1 millisecond (ms), i.e. a constant sampling frequency of around 1000 $s^{-1}$ may be used, and a suitable effective filtering time period may be around 50-100 ms (which thus would correspond to 50-100 sampling time steps and 50-100 data points for each position).

When focusing on how a driver steers or is likely to steer a vehicle there is a particular advantage of damping out rapid varying pressures/forces onto the vehicle body in that such variations may be perceived as vibrations or impacts rather than something a driver of the vehicle should or will compensate for.

The term effective filtering time period relates to the weighing of the plurality of values of the representation of the physical property when calculating the temporal filtered value for the data pints in step B. In many cases one may simply give the same weight factor to all values/data points so that the filtering time period simply is given by the number of data points multiplied with the sampling time step (or by the sum of the sampling time steps if the length of these steps vary). In some situations it may be preferred to use a non-linear weighing function, such as a bell-shaped Gauss curve, that in theory never goes down to zero. The filtering time period would in such a case strictly speaking be infinite, or at least be as long as the total time period. However, at some point on each side of such a curve the value of the weighing function (the weight factor) becomes insignificantly small, i.e. it does not have any significant effect on the calculation of the temporal filtered value. The term effective filtering time period is to be interpreted as the filtering time period during which the weight factor is significant, for instance where the weight factor is larger than $1/1000$ or $1/100$ of the maximum weight factor (which is at the top of the bell for the Gauss curve). Various types of weighing functions may be used. For some weighing functions and in some applications the effective filtering time period may be the period during which the weight factor is larger than $1/10$ of the maximum weight factor, i.e. shorter than when the weight factor is larger than $1/100$ of the maximum weight factor (for the same shape of the weighing function). The effective filtering time period may include two or more part periods. In short, the effective filtering time period is all filtering time that is not unimportant for calculating the temporal filtered value.

The inventive method is not restricted to a flow of air at a vehicle body surface but may be applied to flows of other fluids or mixtures of fluids and to other surfaces or three-dimensional structures, such as a fluid flow in a pipe. Further, the fluid dynamic physical property need not be pressure but may be e.g. friction between a surface and a fluid (mixture) or temperature.

In an embodiment of the invention the sampling time step is in the range 0.05-100 milliseconds, preferably in the range 0.1-3 milliseconds. This is a useful range for most applications. The sampling time step may be based on a constant sampling frequency.

In an embodiment of the invention the effective filtering time period is at least 10 times longer, preferably at least 50 times longer, than the sampling time step.

In an embodiment of the invention the effective filtering time period is in the range 0.01-1 second.

In an embodiment of the invention the total time period is at least 10 times longer than the effective filtering time period.

In an embodiment of the invention the total time temporal filtered value comprises providing each of the plurality of values of the representation of the physical property with a weight factor. The weight factor may be the same for all values, which means that the weight factor is cancelled out in the calculations. Alternatively, the weight factor may vary; it may for instance decrease with increasing distance in time from the data point for which the calculation is carried out. The weight factor may be based on a weighing function, wherein the effective filtering time period corresponds to that part or parts of the weighing function where the weight factor is larger than a threshold weight factor which is in a range of $1/1000$ to $1/10$ of the maximum weight factor of the weighing function. In an embodiment the weighing function may correspond to a discrete Fourier transform, for which the weighing function is a complex exponential function defined over the filter time scale with or without a window function.

In an embodiment of the invention the temporal filtered value is calculated as an arithmetic average of the plurality of values of the representation of the physical property in the same position obtained over the effective filtering time period. This is probably the simplest way to obtain the evened out temporal filtered value.

In an embodiment of the invention the plurality of values of the representation of the physical property in the same position obtained over the effective filtering time period amounts to at least 10 values, preferably at least 50 values. Too few values does not provide for a sufficient dampening effect. How many values that should be included depends on the application.

In an embodiment of the invention the effective filtering time period has a fixed time relation to the data point for which the calculation is carried out. That there must exist some form of relation, a certain relation, between each data point and its corresponding effective filtering time period is evident since if the relation was random no meaningful analysis of the second set of data points can be made. That this relation is fixed means that the time relation between the data point and its corresponding effective filtering time period is the same for all data points. For instance, each data point may be located in the middle of its corresponding effective filtering time period, or be located at one end of its corresponding effective filtering time period, or form the third data point within its corresponding effective filtering time period, etc.

In an embodiment of the invention the effective filtering time period includes the data point for which the calculation is carried out. Preferably, the effective filtering time period is symmetrically distributed in time in relation to the data point for which the calculation is carried out. This is likely to provide the "best" average or other damped value.

In an embodiment of the invention each data point is associated with a position in three dimensions. The at least two dimensions may represent a surface of a vehicle body (which is three-dimensional if bent/curved).

In an embodiment of the invention, one or more pressure sensors, friction sensors, or temperature sensors are applied in one or more positions of the vehicle body surface; the pressure, friction or temperature value is measured in each position of the vehicle body surface with the pressure sensor, friction sensor, or temperature sensor; and the value representing the physical property is obtained from the measured pressure, friction or temperature value in each position of the vehicle body surface associated with the first set of data points. The measured values may are thus obtained from the pressure, friction, or temperature sensors applied on the vehicle body surface. The sensors may be placed in different positions on the vehicle body depending on the design of the vehicle and depending on the number of positions needed for a specific evaluation. When the vehicle body is exposed to transient wind conditions the sensors are measuring the fluid dynamic physical property in each sensor position, wherein measured values for pressure, friction or temperature are obtained.

The invention also concerns:
A data processing system comprising means for carrying out the above method (in any embodiment);
A computer program product comprising instructions which, when the program is executed by a computer, cause the computer to carry out the above method (in any embodiment); and
A non-transitory computer-readable medium comprising instructions which, when executed by a computer, cause the computer to carry out the above method (in any embodiment)
A cloud computing system configured to carry out the above method.

BRIEF DESCRIPTION OF DRAWINGS

In the description of the invention given below reference is made to the following figure, in which.

DESCRIPTION OF EXAMPLE EMBODIMENTS OF THE INVENTION

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

Figure 1:
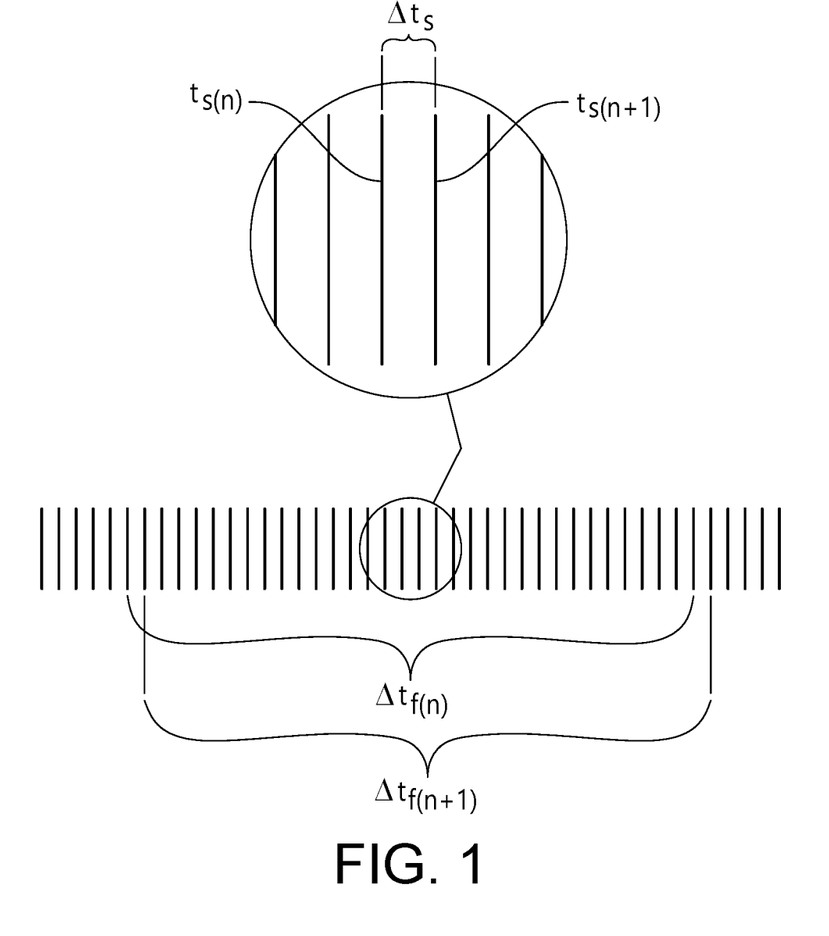
FIG. 1 shows, in a schematic view, an example of a first set of data points separated by a sampling time step and grouped into an effective filtering time period.

FIG. 1 shows, in a schematic view, an example of a first set of data points $t_s$ separated by a sampling time step $\Delta t_s$ and grouped into an effective filtering time period $\Delta t_{f(n)}$. Only a small fraction of the data points $t_s$ contained in the entire first set of data points is shown in FIG. 1. The sampling time step $\Delta t_s$ is in this case constant (i.e. the sampling frequency is constant) and in FIG. 1 exemplified to be the time between adjacent n:th and (n+1):th data points $t_{s(n)}$ and $t_{s(n+1)}$.

Each data point $t_s$ contains in this example information on i) a point of time, ii) a position in three dimensions (a position on a bent/curved vehicle body surface) and iii) a value representing an air pressure (at that point of time and at that position).

The pressure value is not the actual pressure but a value originating from, in this case, a simulated actual pressure.

Depending on the simulation, the vehicle body may be a simulated vehicle construction or a real vehicle construction. As an alternative, the pressure value may instead be measured by sensors positioned on a real vehicle body surface. Further, the friction or temperature may be simulated or measured instead of the pressure if suitable for a specific evaluation.

A number of consecutive data points, including the data points $t_{s(n)}$ and $t_{s(n+1)}$, are grouped together so as to visualize a first effective filtering time period $\Delta t_{f(n)}$. The length of the first effective filtering time period $\Delta t_{f(n)}$ equals the sum of all sampling time steps within that period. FIG. 1 also shows a second effective filtering time period $\Delta t_{f(n+1)}$, which also includes the data points $\Delta t_{s(n)}$ and $\Delta t_{s(n+1)}$ but which is positioned one sampling step later in time (i.e. one step to the right in FIG. 1). As will be described in more detail below the first effective filtering time period $\Delta t_{f(n)}$ is related to the n:th data point $t_{s(n)}$ and the second effective filtering time period $\Delta t_{f(n+1)}$ is related to the (n+1):th data point $t_{s(n+1)}$. Each data point $t_s$ is in a similar way related to a corresponding effective filtering time period $\Delta t_f$ (not shown in the figures).

Figure 2:
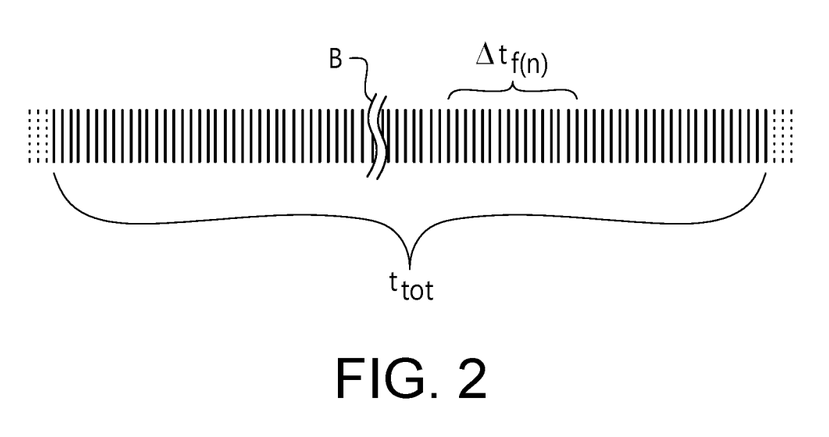
FIG. 2 shows, in a schematic view, an example of a first set of data points set distributed over a total time period with an example of an effective filtering time period.

FIG. 2 shows, in a schematic view, an example of a first set of data points set distributed over a total time period $t_{tot}$ with an example of an effective filtering time period $\Delta t_{f(n)}$. FIG. 2 may be seen as a scaling of FIG. 1 so that the effective filtering time period $\Delta t_{f(n)}$ is the same in FIGS. 1 and 2. A "cut" B is placed in the row of data points of FIG. 2 so as to indicate that the total time period $t_{tot}$ covers much more data points than shown in FIG. 2, which in turn means that the effective filtering time period $\Delta t_{f(n)}$ is much shorter in relation to the total time period $t_{tot}$ than what might be the impression from a quick look at FIG. 2.

Figure 3:
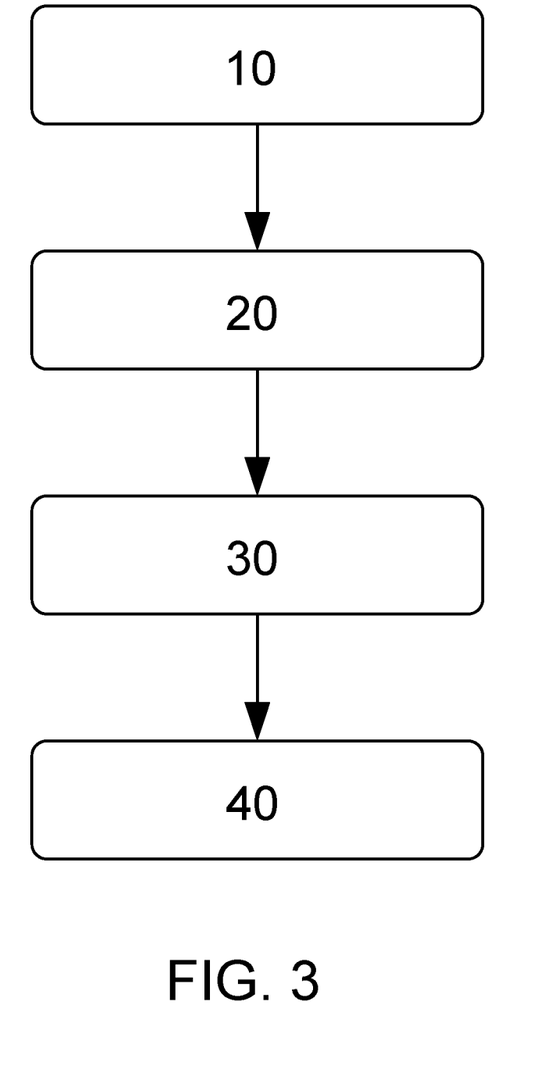
FIG. 3 shows, in a schematic view, an example of method steps.

FIG. 3 shows, in a schematic view, an example of method steps for identifying slow transient variations and/or local spatial variations of a fluid dynamic physical property in a set of data points.

Step 10 includes obtaining a first set of data points $t_s$, i.e. all data points indicated in FIG. 2 that represent the total time period $t_{tot}$. As mentioned above, each of these data points is associated with i) a point of time, ii) a three-dimensional position on a bent/curved vehicle body surface and iii) a value representing the air pressure (at that point of time and at that position). Further, the data points are separated in time by the sampling time step $\Delta t_s$.

Step 20 includes calculating a temporal filtered value of the representation of the air pressure for, in this example, all points of the first set of data points distributed over the total time period $t_{tot}$. The temporal filtered value is based on the plurality of values of the representation of the air pressure in the same position obtained over the corresponding effective filtering time period $\Delta t_f$, i.e. for the n:th data point $t_{s(n)}$ the temporal filtered value is in this case based on all air pressure values obtained during the first effective filtering time period $\Delta t_{f(n)}$, for the (n+1):th data point $t_{s(n+1)}$ the temporal filtered value is based on all air pressure values obtained during the second effective filtering time period $\Delta t_{f(n+1)}$, etc. The temporal filtered value is in this example the arithmetic average of all the air pressure values obtained in the same position within the corresponding effective filtering period. This may be referred to as a moving average.

The effective filtering time period $\Delta t_f$ has a certain time relation to the data point for which the calculation is carried out, and in this example the data point is positioned in the middle of the corresponding filtering time period. As can be seen in FIG. 1 the effective filtering time period $\Delta t_f$ is considerably longer, preferably at least around 50-100 times longer, than the sampling time step $\Delta t_s$. As can be seen in FIG. 2 the effective filtering time period $\Delta t_f$ is at the same time considerably shorter, preferably at least 10 times shorter, than the total time period $t_{tot}$.

Step 30 includes combining the calculated temporal filtered values of the representation of the air pressure with the point of time and position of the corresponding data point $t_s$ in the first set of data points so as to obtain a second set of data points where each value representing the air pressure is the temporal filtered value. Since the temporal filtered values represents an average value of the air pressure over a longer time (i.e. over the filtering time period), the values are damped in time but not in position. This allows for identification of slow transient variations and local spatial variations of the air pressure in the first set of data points.

Step 40 includes analysing in time sequence the second set of data points over the total time period $t_{tot}$. This is preferably carried out by preparing and sequencing a video (including setting colours to different air pressure ranges so as to indicate variations) to allow for a visual analysis.

As described above, the first set of data points $t_s$ obtained is related to a vehicle body surface. The first set of data points $t_s$ is based on measured values or simulated data. The simulated data may for example be established from computer simulations of a car body model in different transient wind conditions. Measured values may for example be collected with suitable sensors arranged on a real car body, where one or more pressure sensors, friction sensors or temperature sensors are applied in one or more positions of the vehicle body surface. The car may be placed in a wind tunnel or alternatively the car may be driven in different transient wind conditions. The sensors are measuring the pressure, friction, or temperature value in each position of the vehicle body surface with the pressure sensor, friction sensor or temperature sensor. The value representing the fluid dynamic physical property from the measured pressure, friction, or temperature value in each position of the vehicle body surface associated with the first set of data points is in this way obtained through the sensor measurements.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a system for simulation, the one or more programs comprising instructions for performing the method according to any one of the above-discussed embodiments. Alternatively, according to another exemplary embodiment a cloud computing system can be configured to perform any of the method aspects presented herein. The cloud computing system may comprise distributed cloud computing resources that jointly perform the method aspects presented herein under control of one or more computer program products. Moreover, the processor may be connected to one or more communication interfaces and/or sensor interfaces for receiving and/or transmitting data with external entities such as e.g. sensors arranged on the vehicle surface, an off-site server, or a cloud-based server.

The processor(s) (associated with the simulation system) may be or include any number of hardware components for conducting data or signal processing or for executing computer code stored in memory. The system may have an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

The invention is not limited by the embodiments described above but can be modified in various ways within the scope of the claims.

What is claimed is:

1. A method for identifying slow transient variations and local spatial variations in vehicle related fluid dynamic conditions of a physical property in a set of data points, the method comprising:

obtaining a first set of data points related to a vehicle body surface, wherein the first set of data points is based on simulated data, wherein each of said data points is associated with at least i) a point of time, ii) a position in at least two dimensions of the vehicle body surface, and iii) a value representing a simulated fluid dynamic physical property comprising one or more of pressure of a fluid, pressure of a mixture of fluids, friction between a surface and a flowing fluid or mixture of fluids, and/or temperature, wherein the data points in each position are separated in time by a sampling time step, wherein the first set of data points represents a total time period;

determining a temporal filtered value of the representation of the physical property for at least a portion of the first set of data points distributed over the total time period, wherein the temporal filtered value comprises an arithmetic average of a plurality of values of the representation of the physical property at a same position in the at least two dimensions of the vehicle body surface obtained over a filtering time period covering a plurality of data points, wherein the filtering time period has a time relation to the data point for which the determining is carried out and wherein the filtering time period is longer than an average sampling time step and shorter than the total time period represented by the first set of data points;

combining at least a portion of the determined temporal filtered values of the representation of the physical property with the point of time and position of the corresponding data point in the first set of data points so as to obtain a second set of data points where each value representing the physical property is the temporal filtered value, and wherein the second set of data points comprises a moving average having values that are damped in time but not in position in the least two dimensions of the vehicle body surface; and identifying the slow transient variations and the local spatial variations in the vehicle related fluid dynamic conditions of the physical property in the second set of data points, the identifying comprising generating a video based on the second set of data points in time sequence over at least a portion of the total time period comprising setting selected colors to selected value ranges of the representation of the physical property so that color changes indicate changes of the value of the physical property, wherein sequencing the generated video enables by observation of the color changes visual analysis of the slow transient variations and the local spatial variations in the vehicle related fluid dynamic conditions of the physical property.

2. The method according to claim 1, wherein the sampling time step is in the range of 0.05-100.

3. The method according to claim 1, wherein the effective filtering time period is at least 10 times longer than the sampling time step.

4. The method according to claim 1, wherein the effective filtering time period is in the range of 0.01-1 second.

5. The method according to claim 1, wherein the total time period is at least 10 times longer than the effective filtering time period.

6. The method according to claim 1, wherein the total time period is at least 1 second.

7. The method according to claim 1, wherein the temporal filtered value is calculated so as to form a value that lies between a maximum and a minimum of the plurality of values of the representation of the physical property in the same position obtained over the effective filtering time period.

8. The method according to claim 1, wherein the calculating the temporal filtered value comprises providing each of the plurality of values of the representation of the physical property with a weight factor.

9. The method according to claim 1, wherein the plurality of values of the representation of the physical property in the same position obtained over the effective filtering time period amounts to at least 10 values.

10. The method according to claim 1, wherein the effective filtering time period has a fixed time relation to the data point for which the calculation is carried out.

11. The method according to claim 1, wherein the effective filtering time period includes the data point for which the calculation is carried out.

12. The method according to claim 1, wherein the effective filtering time period is symmetrically distributed in time in relation to the data point for which the calculation is carried out.

13. The method according to claim 1, wherein each data point is associated with a position in three dimensions.

14. The method according to claim 1, wherein the obtaining the first set of data points related to the vehicle body surface comprises:
   applying one or more pressure sensors, friction sensors or temperature sensors in one or more positions of the vehicle body surface;
   measuring the pressure, friction, or temperature value in each position of the vehicle body surface with the pressure sensor, friction sensor or temperature sensor; and
   obtaining the value representing the physical property from the measured pressure, friction, or temperature value in each position of the vehicle body surface associated with the first set of data points.

15. A non-transitory computer-readable storage medium comprising instructions that, when executed by a computer, cause the computer to perform a method for identifying slow transient variations and local spatial variations in vehicle related fluid dynamic conditions of a physical property in a set of data points comprising:
   obtaining a first set of data points related to a vehicle body surface, wherein the first set of data points is based on simulated data, wherein each of said data points is associated with at least i) a point of time, ii) a position in at least two dimensions of the vehicle body surface, and iii) a value representing a simulated fluid dynamic physical property comprising one or more of pressure of a fluid, pressure of a mixture of fluids, friction between a surface and a flowing fluid or mixture of fluids, and/or temperature, wherein the data points in each position are separated in time by a sampling time step, wherein the first set of data points represents a total time period;
   determining a temporal filtered value of the representation of the physical property for at least a portion of the first set of data points distributed over the total time period, wherein the temporal filtered value comprises an arithmetic average of a plurality of values of the representation of the physical property at a same position in the at least two dimensions of the vehicle body surface obtained over a filtering time period covering a plurality of data points, wherein the filtering time period has a time relation to the data point for which the determining is carried out and wherein the filtering time period is longer than an average sampling time step and shorter than the total time period represented by the first set of data points;
   combining at least a portion of the determined temporal filtered values of the representation of the physical property with the point of time and position of the corresponding data point in the first set of data points so as to obtain a second set of data points where each value representing the physical property is the temporal filtered value, and wherein the second set of data points comprises a moving average having values that are damped in time but not in position in the least two dimensions of the vehicle body surface; and
   identifying the slow transient variations and the local spatial variations in the vehicle related fluid dynamic conditions of the physical property in the second set of data points, the identifying comprising generating a video based on the second set of data points in time sequence over at least a portion of the total time period comprising setting selected colors to a selected value ranges of the representation of the physical property so that color changes indicate changes of the value of the physical property, wherein sequencing the generated video enables by observation of the color changes visual analysis of the slow transient variations and the local spatial variations in the vehicle related fluid dynamic conditions of the physical property.

16. A cloud computing system comprising:
a processor;
a memory device operatively coupled with the processor; and
computer code stored in memory device, the computer code being executable by the processor to perform a method for identifying slow transient variations and local spatial variations in vehicle related fluid dynamic conditions of a physical property in a set of data points, the method comprising:
   obtaining a first set of data points related to a vehicle body surface, wherein the first set of data points is based on simulated data, wherein each of said data points is associated with at least i) a point of time, ii) a position in at least two dimensions of the vehicle body surface, and iii) a value representing a simulated fluid dynamic physical property comprising one or more of pressure of a fluid, pressure of a mixture of fluids, friction between a surface and a flowing fluid or mixture of fluids, and/or temperature, wherein the data points in each position are separated in time by a sampling time step, wherein the first set of data points represents a total time period;
   determining a temporal filtered value of the representation of the physical property for at least a portion of the first set of data points distributed over the total time period, wherein the temporal filtered value comprises an arithmetic average of a plurality of values of the representation of the physical property at a same position in the at least two dimensions of the vehicle body surface obtained over a filtering time period covering a plurality of data points, wherein the filtering time period has a time relation to the data point for which the determining is carried out and wherein the filtering time period is longer than an average sampling time step and shorter than the total time period represented by the first set of data points;
   combining at least a portion of the determined temporal filtered values of the representation of the physical property with the point of time and position of the corresponding data point in the first set of data points so as to obtain a second set of data points where each value representing the physical property is the temporal filtered value, and wherein the second set of data points comprises a moving average having values that are damped in time but not in position in the least two dimensions of the vehicle body surface; and identifying the slow transient variations and the local spatial variations in the vehicle related fluid dynamic conditions of the physical property in the second set of data points, the identifying comprising generating a video based on the second set of data points in time sequence over at least a portion of the total time period comprising setting selected colors to a selected value ranges of the representation of the physical property so that color changes indicate changes of the value of the physical property, wherein sequencing the generated video enables by observation of the color changes visual analysis of the slow transient variations and the local spatial variations in the vehicle related fluid dynamic conditions of the physical property.

* * * * *